United States Patent
Bataller (10) Patent No.: US 10,185,358 B1
(45) Date of Patent: Jan. 22, 2019

(54) ELECTRONIC TABLET PROTECTIVE CARRYING CASE AND DISPLAY STAND

(71) Applicant: Andrew Padua Bataller, Chula Vista, CA (US)

(72) Inventor: Andrew Padua Bataller, Chula Vista, CA (US)

( * ) Notice: Subject to any disclaimer, the term of this patent is extended or adjusted under 35 U.S.C. 154(b) by 0 days.

(21) Appl. No.: 15/947,798

(22) Filed: Apr. 7, 2018

(51) Int. Cl.
*A45F 5/10* (2006.01)
*G06F 1/16* (2006.01)
*A45C 11/00* (2006.01)

(52) U.S. Cl.
CPC .............. *G06F 1/1628* (2013.01); *A45F 5/10* (2013.01); *A45C 2011/003* (2013.01); *A45C 2200/15* (2013.01); *A45F 2005/1006* (2013.01); *A45F 2200/0525* (2013.01); *G06F 2200/1633* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,100,098 A | * | 3/1992 | Hawkins | F16M 11/041 16/339 |
| 8,801,065 B1 | | 8/2014 | Jones | |
| 8,844,817 B2 | * | 9/2014 | Glanzer | G06K 7/082 235/449 |
| 8,885,338 B1 | | 11/2014 | Simpson et al. | |
| 8,925,722 B2 | | 1/2015 | Poon et al. | |
| 9,141,136 B2 | | 9/2015 | Schulenberger | |
| 9,141,145 B2 | * | 9/2015 | White | G06F 1/1675 |
| 9,144,279 B2 | * | 9/2015 | Venida | A45C 11/34 |
| 9,256,258 B2 | | 2/2016 | Burch et al. | |
| 9,259,076 B2 | | 2/2016 | Gayler | |
| 9,382,033 B2 | | 7/2016 | Poon et al. | |
| 9,575,516 B2 | | 2/2017 | Probst et al. | |
| 9,591,905 B2 | | 3/2017 | Poon et al. | |
| 9,655,434 B2 | * | 5/2017 | Briant | F16M 11/041 |
| 9,727,085 B2 | * | 8/2017 | Weldon | G06F 1/1632 |
| 2014/0001081 A1 | * | 1/2014 | Rosen | B65D 85/30 206/588 |
| 2014/0166658 A1 | * | 6/2014 | Hamra | A45F 5/00 220/500 |
| 2014/0166832 A1 | * | 6/2014 | Briant | F16M 11/041 248/205.1 |

(Continued)

*Primary Examiner* — Lisa Lea-Edmonds
(74) *Attorney, Agent, or Firm* — Kenneth W. Float (57) ABSTRACT

Disclosed is apparatus for protecting, carrying, and displaying an electronic tablet device. The apparatus comprises a housing with handles and a cavity that receives and surrounds the device. The cavity has a front surface opening configured to expose operative portions of a front surface of the device when disposed in the cavity, one or more rear surface openings that expose operative components of a rear surface of the device when disposed in the housing, and a locking device that secures the device within the housing. The housing may also include wireless speakers. A protective stand has an opening extending therethrough that slidably receives the housing, prevents the stand from loosing contact with the housing when carried, and covers the front and rear openings of the housing when carried. The stand has angled and orthogonal slots formed on an outer surface that support the housing for display.

20 Claims, 11 Drawing Sheets

(56) References Cited

U.S. PATENT DOCUMENTS

| | | | |
|---|---|---|---|
| 2015/0365120 A1* | 12/2015 | Wojcik | G06K 7/082 455/573 |
| 2016/0119013 A1* | 4/2016 | Wojcik | G06K 7/082 455/573 |

* cited by examiner

ELECTRONIC TABLET PROTECTIVE CARRYING CASE AND DISPLAY STAND

BACKGROUND

The present invention relates generally to electronic tablet device carrying cases and stands for use therewith, and more particularly, to a protective carrying case with handles and protective display stand for protecting, carrying, and displaying a tablet device.

Numerous carrying cases, with and without handles, and with and without stands, have heretofore been designed for carrying and protecting different types of electronic tablet devices. Commonly, tablet device stands have been integrated into the cases and fold or rotate into place to support the tablet device. Also, stand-alone tablet device stands have heretofore used to support tablet devices. However, no known carrying case has included a stand through which the tablet is inserted that protects the tablet while it is carried and also includes structures for preventing the stand from disengaging from the housing while it is carried and displaying the tablet device to a user.

Exemplary electronic tablet carrying cases are sold on eBay.com and Amazon.com, for example, and include cases manufactured by Binuoda, HGD, and XumaUSA, for example. Exemplary tablet carrying cases and devices are disclosed in recently-issued U.S. Pat. Nos. 9,256,258, 9,591,905, 9,575,516, 9,382,033, 9,259,076, 9,141,136, 8,925,722, 8,885,338, and 8,801,065. Electronic tablet cases that include speakers are manufactured by LG and JBL, for example. Again, however, no known carrying case with, or without, speakers has included a stand through which the tablet is inserted that protects the tablet while it is carried and also includes structures for preventing the stand from disengaging from the housing while it is carried and displaying the tablet device to a user.

It would be desirable to have electronic tablet device carrying apparatus that is used to protect, carry, and display an electronic tablet device. It would be desirable to have electronic tablet device carrying apparatus that includes a stand that provides a protective cover for the electronic tablet while it is carried, and that can display the tablet device vertically or at a predetermined viewing angle. It would be desirable to have electronic tablet device carrying apparatus that optionally includes wireless speakers.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which:

FIG. 3a is a cross-sectional view of the exemplary housing shown in FIG. 3, taken along the lines 3a-3a;

DETAILED DESCRIPTION

Figure 1:
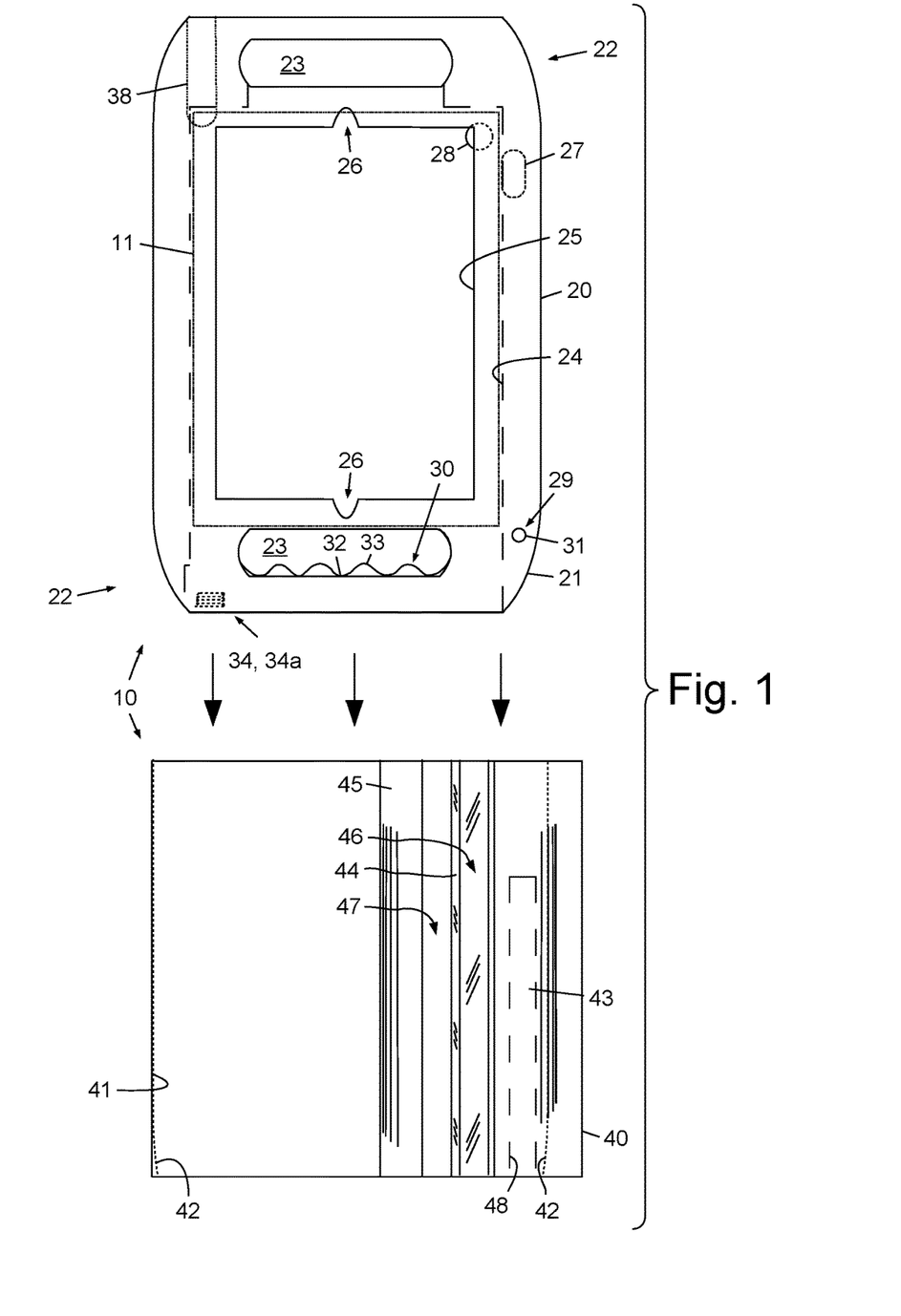
FIG. 1 shows components of an exemplary electronic tablet device carrying apparatus.

Referring to the drawing figures, disclosed is exemplary apparatus 10 for protecting, carrying, and displaying an electronic tablet device 11, or electronic tablet 11. The exemplary apparatus 10 is designed for use with an electronic tablet 11 such as an IPAD MINI®, IPAD®, or IPAD PRO® tablet, manufactured by Apple, or tablet devices 11 manufactured by Amazon, Microsoft, and Samsung, for example. FIG. 1 shows components of an embodiment of exemplary apparatus 10 for protecting, carrying, and displaying the electronic tablet device 11, shown as a rectangular outline. The primary components of the exemplary apparatus 10 include a housing 20 having a locking device 30, and a protective stand 40. The protective stand 40 is used to support the housing 20 in vertical and angled positions for viewing, and protect the tablet 11 while it is carried.

Figure 2:
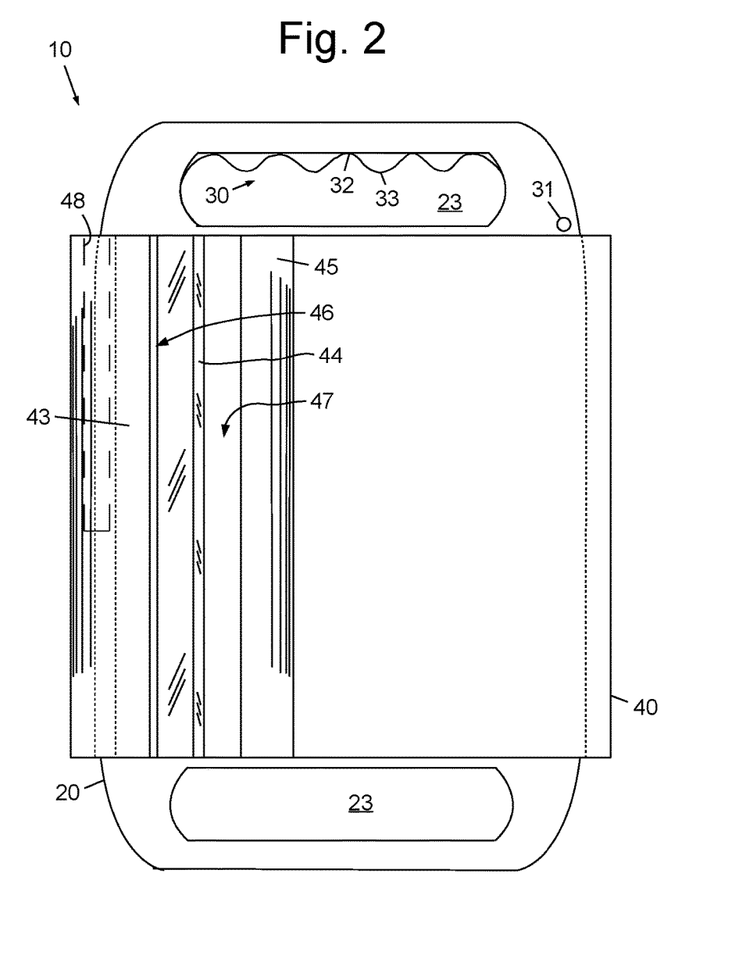
FIG. 2 shows the exemplary electronic tablet device carrying apparatus of FIG. 1 in an assembled condition.

The housing 20 has a generally rectangular shape with elongated openings 23 disposed at opposite ends that form handles 22. The exemplary housing 20 shown in FIG. 1 has inwardly contoured ends 21 adjacent the handles 22. The inwardly contoured ends 21 of the housing 20 also provide a means for preventing the stand 40 from disengaging from the housing 20 when the assembled apparatus 10 is carried, which will be discussed in more detail below with reference to FIGS. 2 and 5. FIG. 2 shows the exemplary apparatus 10 of FIG. 1 in an assembled condition or state. The assembled condition or state is achieved, illustrated by the downwardly pointing arrows in FIG. 1, by inserting the tablet 11 in the housing 20, securing the tablet 11 in the housing 20 using a locking device 30, which may preferably be rotatable, and sliding the housing 20 with enclosed tablet 11 through an opening 41 in the stand 40, as indicated by the downwardly pointing arrows, until the handle 22 protrudes from the stand 40 as shown in FIG. 2. The protruding handle 22 is gripped by the user to carry the apparatus 10.

A preferred embodiment of the housing 20 comprises a cavity 24 into which the tablet 11 is slid from a locking end and which encases the tablet 11. An open window 25 is disposed in a front surface of the housing 20 having a predefined contour that allows a touchscreen of the tablet 11 to be viewed. An exemplary contour includes cutouts 26 that allow access to selected front-facing components of the tablet 11, including its home button and front camera, for example. Openings 27, 28 in a rear surface of the housing 20 provides access to selected rear-facing components of the tablet 11, including its rear camera and light, and volume switches, for example. Access to a connector port and internal speakers of the tablet 11 is provided via the openings 23 that form the handles 22 and the configuration of the cavity 24 which is open adjacent the handles 22. A slot opening 38 in the rear surface of the housing 20 provides access to a headphone jack port.

The locking device 30 is disposed at a locking end of the housing 20 and may be rotatable by way of projections 31 that extend into holes 29 in front and back surfaces of the housing 20 and function as an axel. Alternatively, a dowel 36 having fully or partially flat sides (shown in FIGS. 9-11) may preferably be used as the axel, which is inserted into the holes 29, and to which the locking device is connected to secure it to the housing 20. The locking device 30 preferably has a finger grip 32, although this is not absolutely required. The finger grip 32 extends into the elongated handle opening 23 and is used to carry the housing 20 and open the locking device 30, which is achieved by pressing on raised portions 33 of the finger grip 32 to rotate the locking device 30 out of the housing 20. The rotatable locking device 30 is tapered and narrows toward an end distal from the axel. The rotatable locking device 30 has an alligator-type projection 34 extending from a side surface near the end of the tapered portion, and a mating alligator-type projection 34a extends inwardly toward the projection 34 from an adjacent inner front or rear surface of the cavity 24 and engages therewith to secure the handle 30 when the handle 30 is rotated into the cavity 24. Closing the rotatable locking device 30 as shown in FIG. 1 secures the electronic tablet 11 in the cavity 24 of the housing 20.

It is to be understood that other types of locking device 30 may be employed in variations of the apparatus 10. For example, a separate end-cap type locking device 30 that is inserted into the end of the cavity 24 and held in by friction or lateral projections and cooperative holes in the housing 20 may readily be employed. Also, an appropriately configured hinged locking device 30 may readily be employed.

In summary, the apparatus 10 thus has a housing 20 with handles 22 at opposite ends thereof and a cavity 24 sized to receive and surround the tablet device 11. The cavity 24 has a front surface opening 25 con figured to expose operative portions of the front surface of the electronic tablet device 11 when it is disposed in the cavity 24. The housing 20 has one or more openings 27, 28 disposed in a rear surface of the cavity 24 that expose one or more operative components of the rear surface of the tablet device 11 when it is disposed in the housing 20. The locking device 30 is insertable into the open end of the cavity 24 to secure the tablet device 11 within the housing 20.

Figure 5:
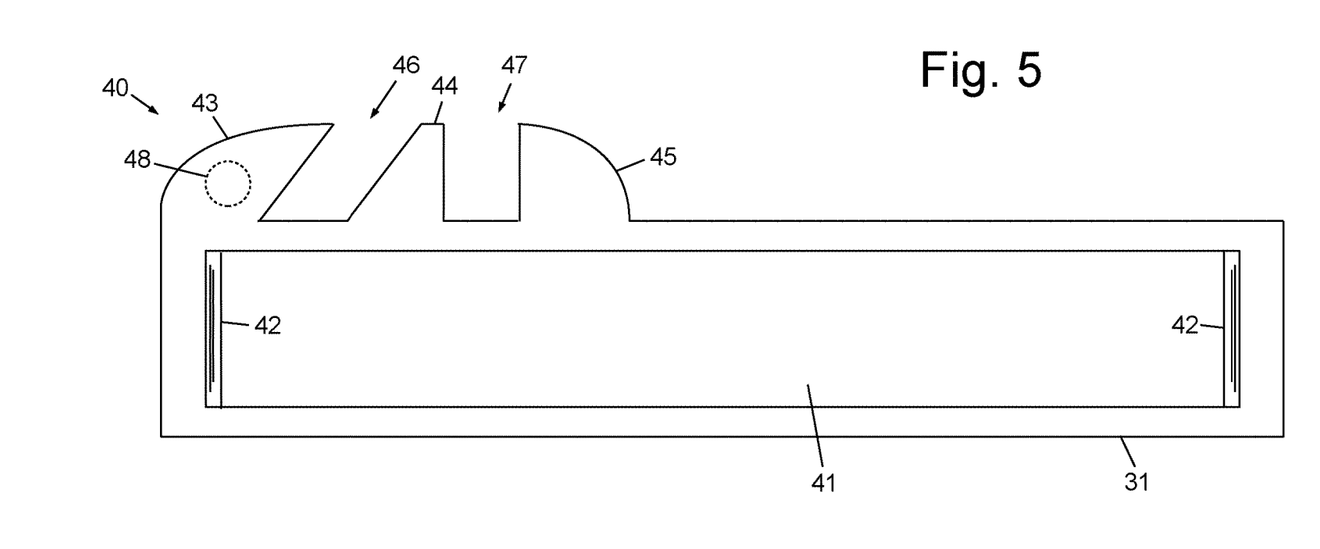
FIG. 5 is an end view of an exemplary stand.
Figure 6:
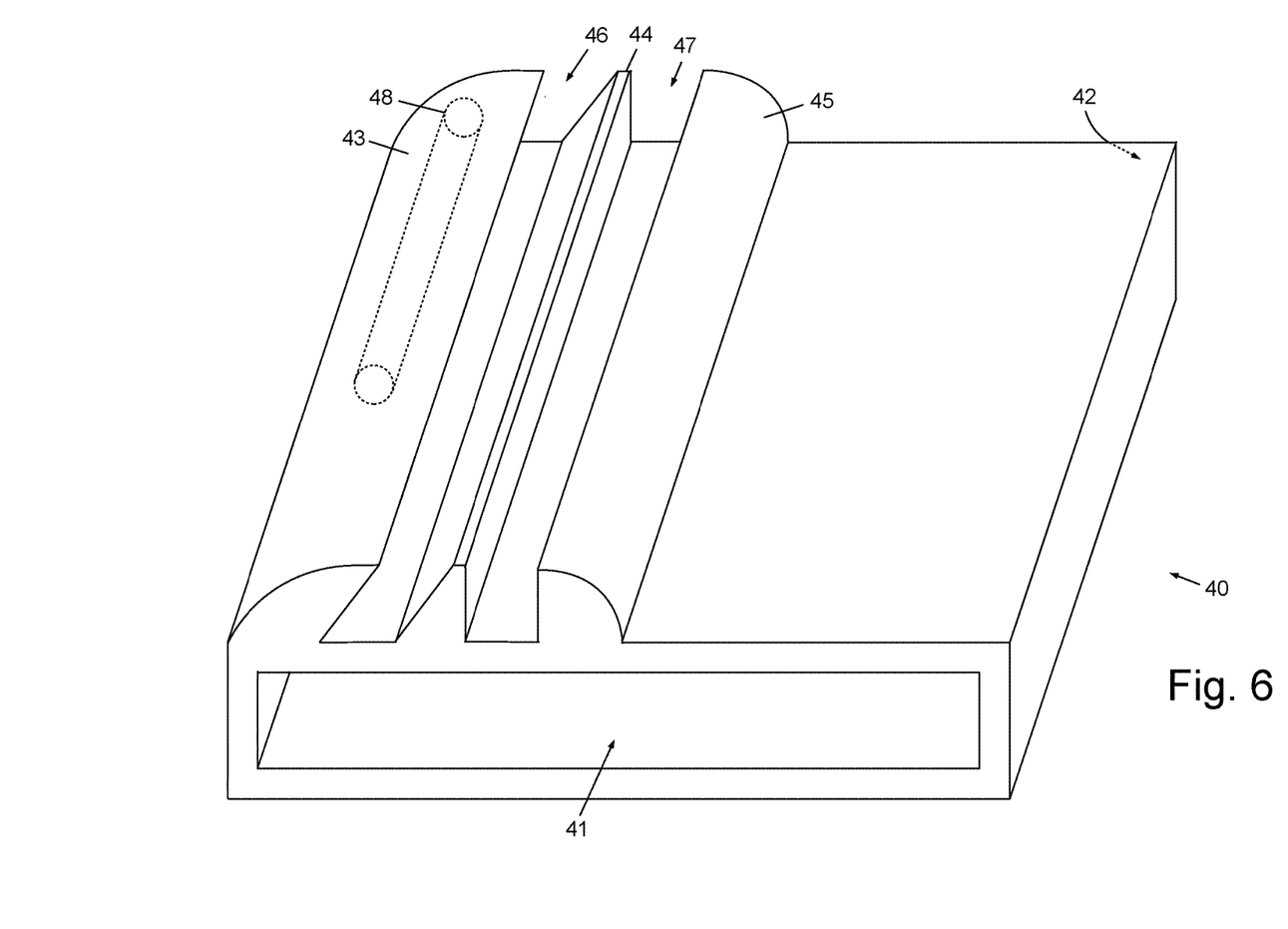
FIG. 6 is a three-dimensional view of the exemplary stand shown in FIG. 5.

The protective stand 40 has a generally rectangular longitudinal opening 41 extending therethrough that is sized to accept the housing 20. The protective stand 40 has an inner contour 42 adjacent one end that substantially matches the inward contour 21 of the housing 20. FIG. 5 is an end view of an exemplary stand 40 showing its opening 41 and its inner contour 42. As is illustrated om FIGS. 1 and 2. for example. the longitudinal opening 41 is configured to slidably receive the housing 20 and cover the front window 25 and rear surface openings 27, 28 of the housing 20 when the stand 40 is slid over the housing 20. FIG. 6 is a three-dimensional view of the exemplary stand 40 shown in FIG. 5. As mentioned above, the inner contour 42 prevents the stand 40 from disengaging from the housing 20 when the stand 40 is slid over the housing 20 to assemble the apparatus 10 as shown in FIG. 2 and the apparatus 10 is carried. The use of matching contours 21, 42 on the housing 20 and the stand 40 provides a substantial amount of surface contact area between the housing 20 and the stand 40 to ensure that the stand 40 cannot slide past the housing 20 when carried. It is to be understood that other housing contours 21 and stand inner contours 42 may be used to prevent the stand 40 from sliding away from the housing 20 when carried, including mating stepped contours 42, for example.

External projections 43, 44, 45 are formed on a surface of the stand 40 that extend away from the otherwise flat surface of the stand 40. These projections 43, 44, 45 are shown more clearly in FIGS. 5 and 6. A first, outermost projection 43 has a curved outer surface that terminates at an edge of an angled opening or angled slot 46 whose first wall is formed by an angled inner surface of the projection 43 that terminates at the flat surface of the stand 40. A second wall of the angled slot 46 is formed by an angled surface of a second projection 44. The second projection 44 has a thin outer flat surface and a third surface that is orthogonal to the flat surface of the stand 40. The third surface forms a first wall of an orthogonal slot 47. A third, quarter-round projection 45 has a flat surface separated from the third surface of the second projection 44. The adjacent flat surfaces of the second and third projections 44, 45 form the orthogonal slot 47. The two slots 46, 47 are nominally oriented at 45 degrees and 90 degrees, respectively, to the adjacent flat surface of the stand 40. The first, outermost projection 43 has a circular cavity 48 extending along a portion of its length with an opening above the inner contour 42. The circular cavity 48 is sized and configured to receive a stylus, pencil, or pointing device, such as an Apple Pencil, for example. The opening of the circular cavity 48 is at an end of the outermost projection 43 that faces upward when the stand 40 and housing 20 are mated and carried. This prevents the stylus, pencil, or pointing device from falling when the stand 40 and housing 20 are carried.

The protective stand 40 is configured to prevent the stand 40 from losing contact with the housing 20 when carried, and cover the front and rear surface openings 25, 27, 28 of the housing 20 when carried. The angled and orthogonal slots 46, 47 formed on the outer surface of the stand 40 are configured to receive a selected edge of the housing 20 to support the housing 20 vertically and at about 45 degrees for display to a user.

In summary, the apparatus 10 has a protective stand 40 with an opening 41 extending therethrough that is configured to slidably receive the housing 20, prevent the stand 40 from losing contact with the housing 20 when carried, and cover the front and rear surface openings 25, 27, 28 of the housing 20 when carried. The apparatus 10 also has angled and orthogonal slots 46, 47 formed on an outer surface that are sized to receive a selected edge of the housing 20 to support it for display to a user.

Preferably, outer lateral edges of at least one end of the housing 20 are inwardly contoured 21 and lateral inner edges 42 of the opening 41 of the protective stand 40 are similarly contoured 42 to prevent the stand 40 from losing contact with the housing 20 when it is carried.

Figure 3:
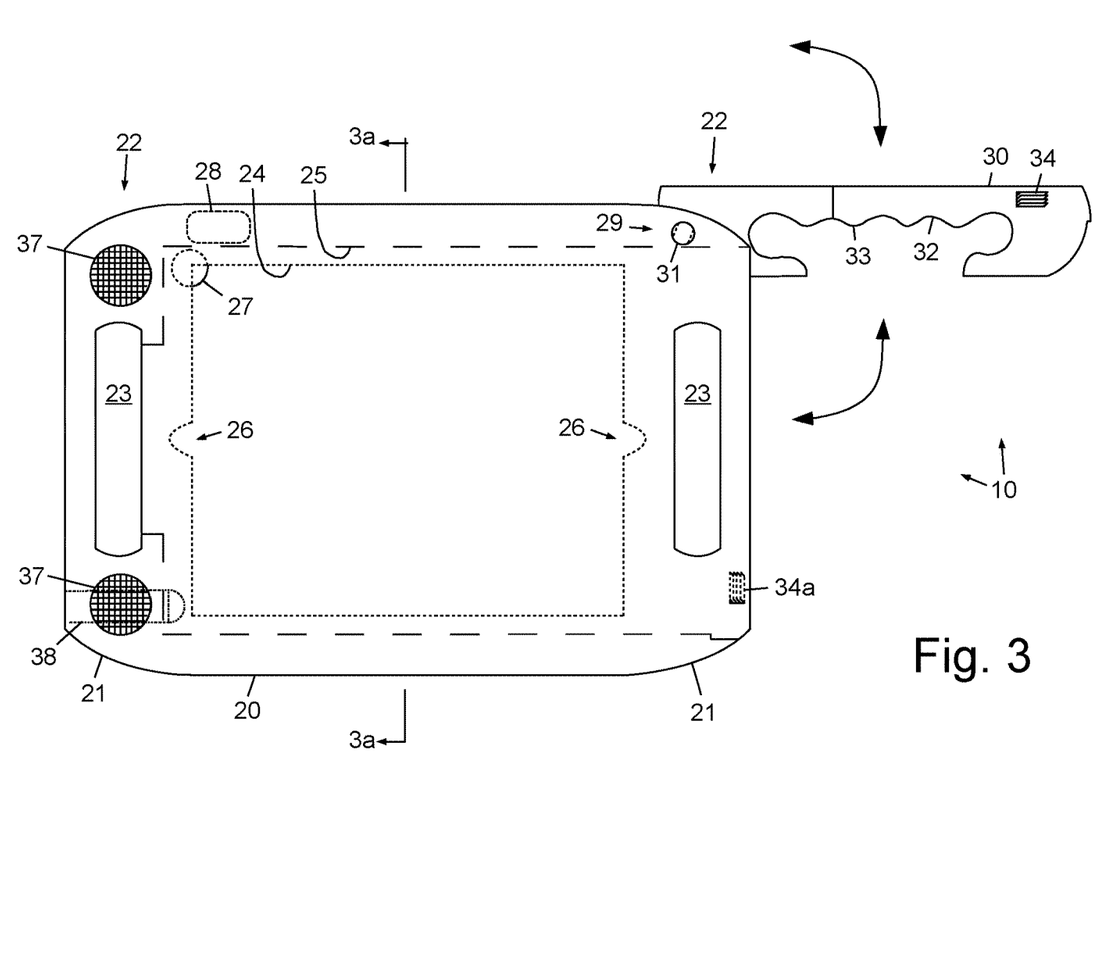
FIG. 3 is a front view of a housing of exemplary electronic tablet device carrying apparatus that includes speakers.
Figure 3A:
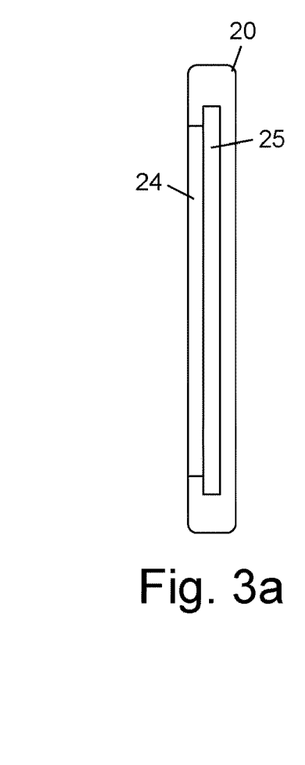
Figure 4:
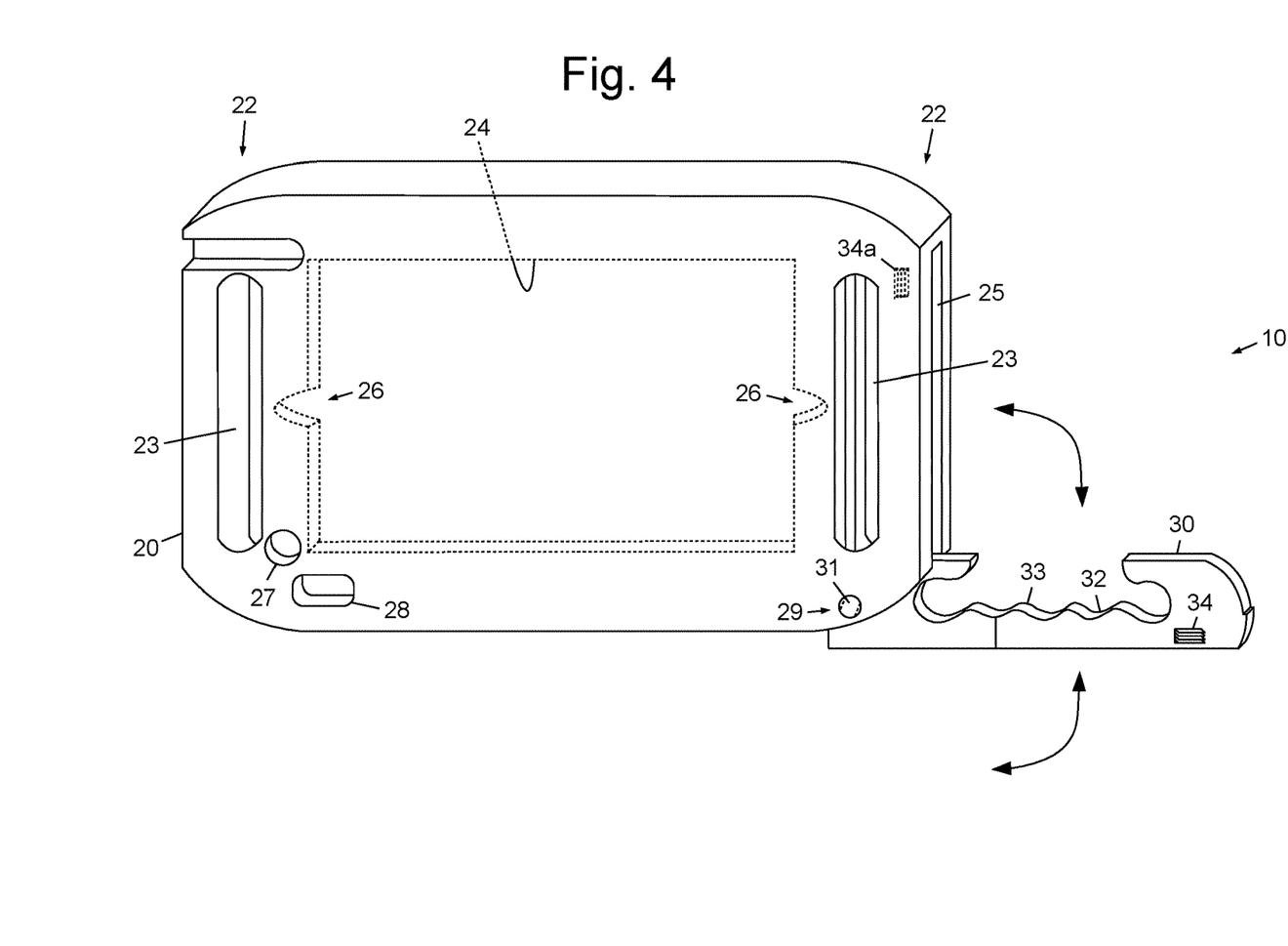
FIG. 4 is a three-dimensional rear view of an exemplary housing.

FIG. 3 is a front view of an exemplary housing 20 that includes wireless speakers 37. FIG. 3a is a cross-sectional view of the exemplary housing 20 shown in FIG. 3, taken along the lines 3a-3a. The wireless speakers 37 are preferably Bluetooth® wireless speakers 37 that are disposed in suitably-located cavities in the housing 20. Exemplary wireless speakers 37 are about one inch in diameter and one-half inch deep. Bluetooth wireless speakers 37 are readily available. FIG. 4 is a three-dimensional rear view of an exemplary housing 20.

FIGS. 3 and 4 illustrate details of the structure of the exemplary locking device 30. The locking device 30 is generally U-shaped and rotates about an axis de fined by projections 31 adjacent an end of the device 30 that extend laterally and insert into holes 29 in the housing 20. The locking device 30 rotates about the axis into and out of the end of the cavity 24. The locking device 30 has a wavy edge comprising the raised portions 33 that forms the finger grip 32 that projects into the adjacent opening 23. The raised portions 33 of the finger grip 32 allows the user to rotate the locking device 30 out of the cavity 24 allowing removal of the tablet device 11 from the housing 20.

The housing 20, stand 30, and locking device 30 are preferably made of molded plastic, which is a cost-effective way to fabricate the components with their intricate contours and shapes. However, it is to be understood that the housing 20, stand 30, and locking device 30 may be fabricated using any suitable material.

Figure 7:
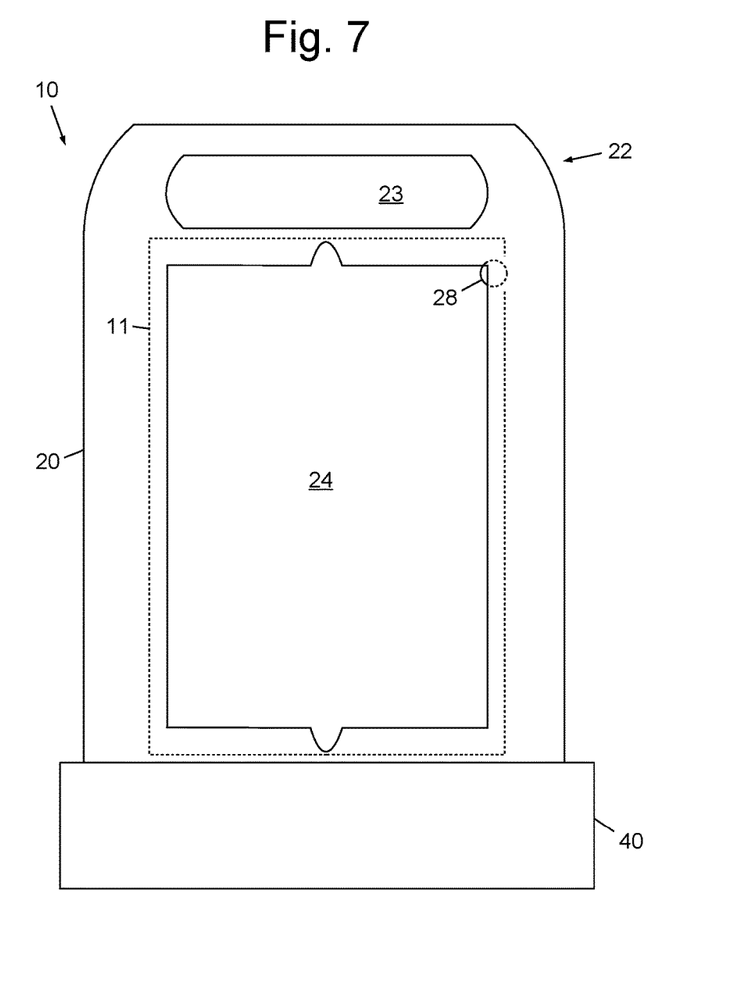
FIG. 7 shows an exemplary housing inserted into a vertical slot of the exemplary stand.
Figure 8:
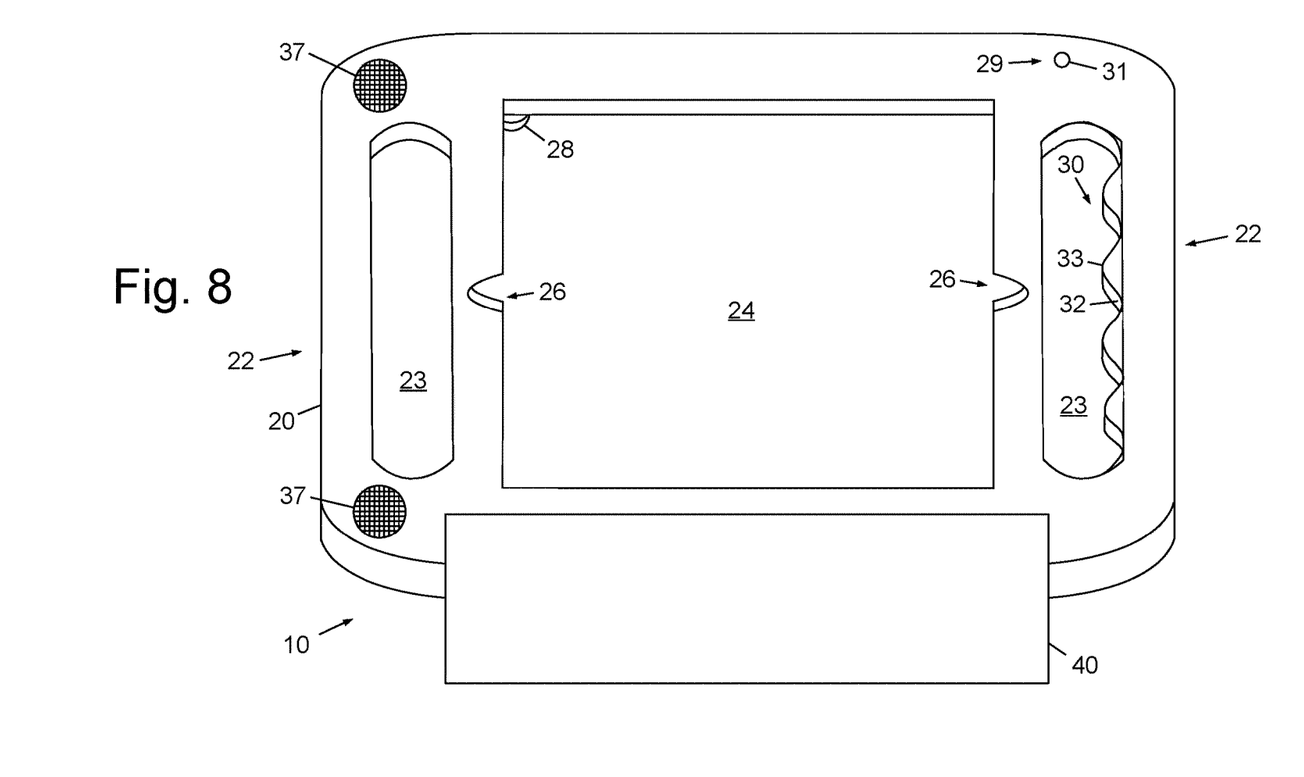
FIG. 8 shows an exemplary housing inserted into an angled slot of the exemplary stand.

The protective stand 30 provides a means for holding the housing 20 to display the tablet device 11 to the user. Vertical and fixed angled (45 degrees, for example) display orientations are provided by the stand 30. FIG. 7 shows an exemplary housing 20 inserted into the vertical slot 47 of an exemplary stand 40. This provides for vertical display of the tablet device 11. FIG. 8 shows an exemplary housing 20 inserted into the angled slot 46 of an exemplary stand 40. This provides for display of the tablet device 11 if the stand if placed on a surface that is substantially lower than the eyes of the user or viewer.

Figure 9:
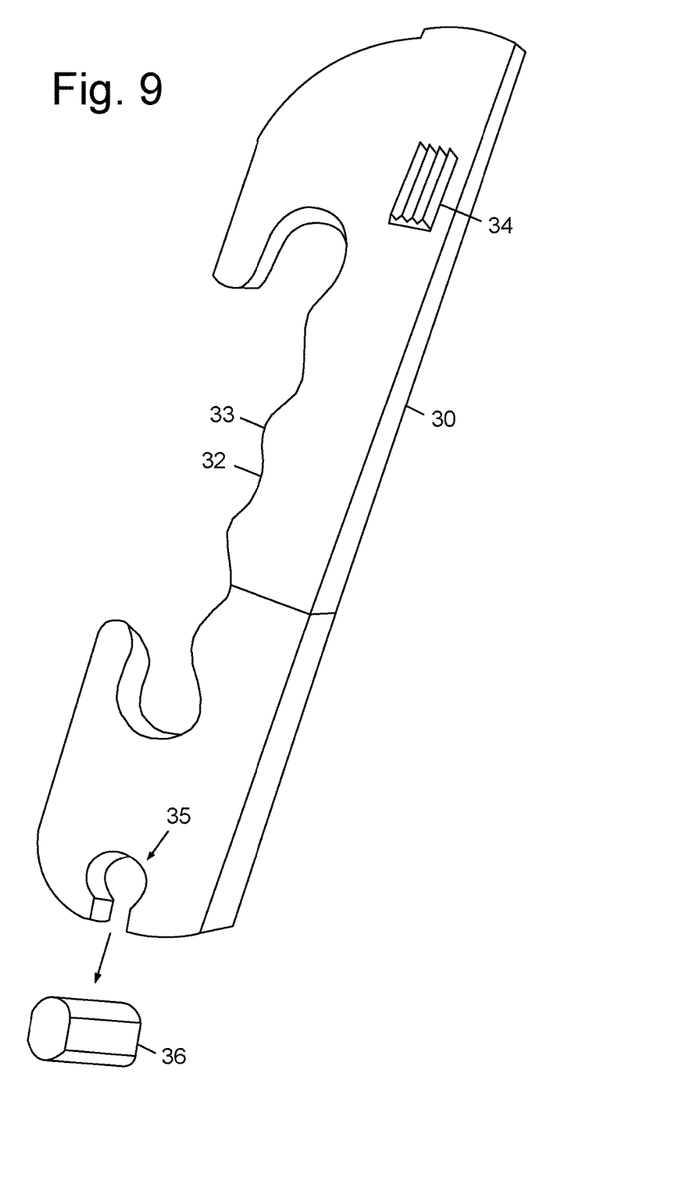
FIG. 9 shows a three-dimensional view of an exemplary locking handle that may be used in the exemplary electronic tablet device carrying apparatus.
Figure 10:
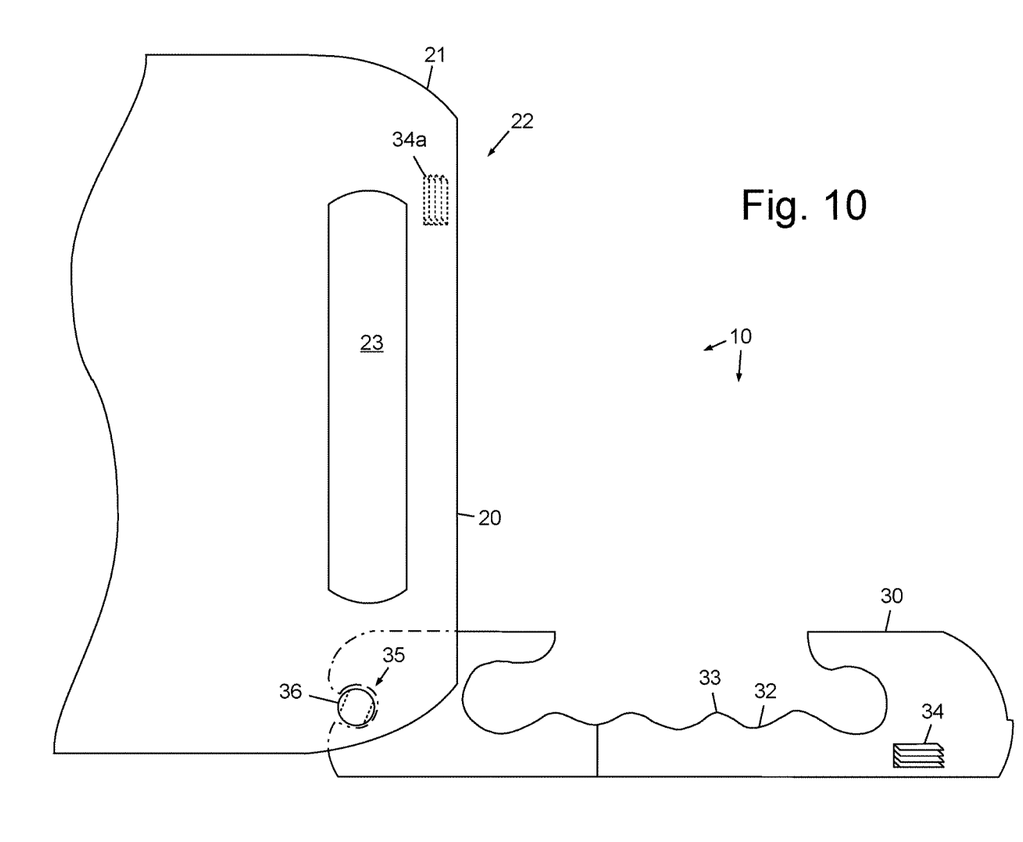
FIG. 10 is a side view of the exemplary locking handle shown in FIG. 9 rotated towards a fully open position.
Figure 11:
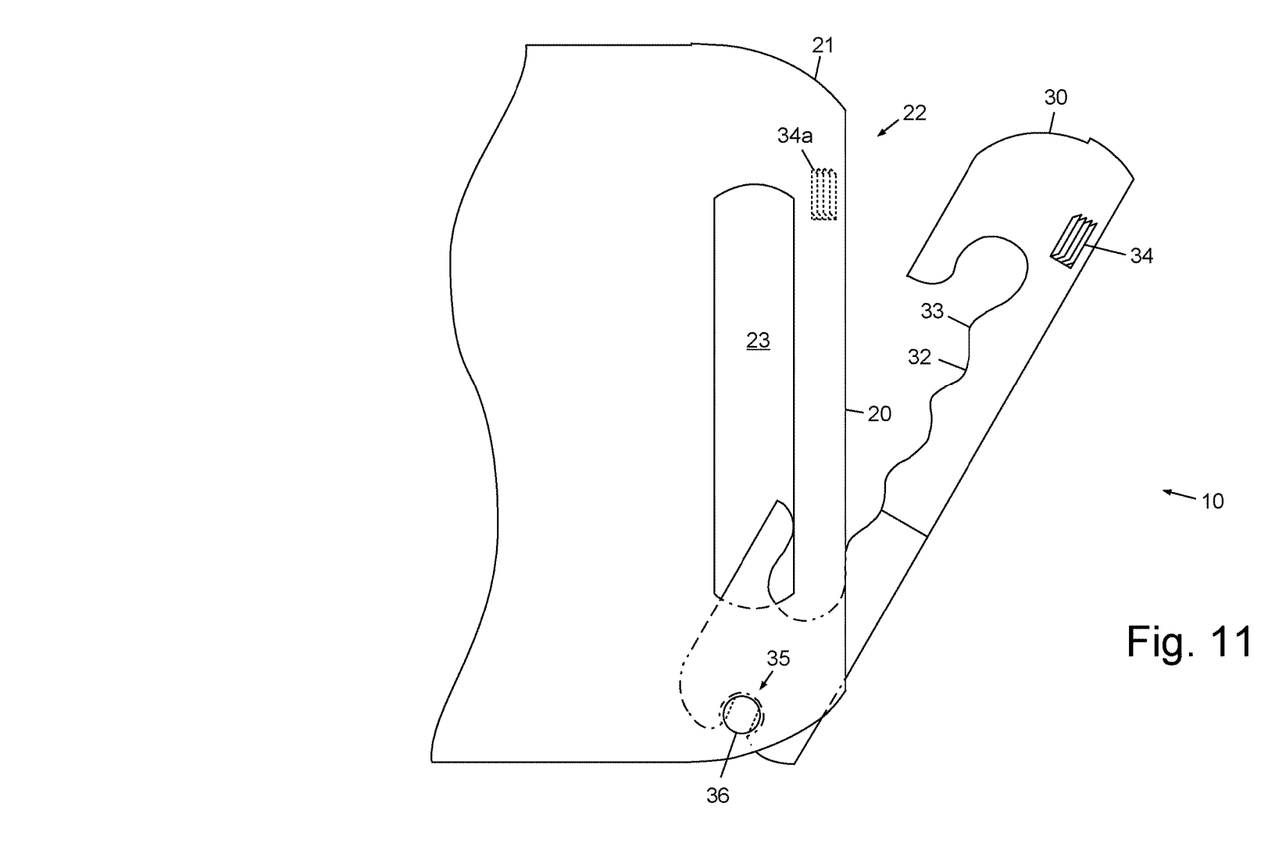
FIG. 11 is a side view of the exemplary locking handle shown in FIG. 10 rotated towards a closed position.

FIG. 9 shows a three-dimensional view of an exemplary locking handle 30 that may be used in the exemplary electronic tablet device carrying apparatus 10. FIG. 10 is a side view of the exemplary locking handle 30 shown in FIG. 9 rotated towards a fully open position. FIG. 11 is a side view of the exemplary locking handle 30 shown in FIG. 10 rotated towards a closed position. In this embodiment, the locking handle 30 includes an alligator-type projection 34 extending from one side of the handle 30 toward the front of rear inner surface of the cavity 24 in the housing 20. A mating alligator-type projection 34a extends inwardly from the front of rear inner surface of the cavity 24 toward the projection 34 on the handle 30 and engages therewith to secure the handle 30 when the handle 30 is rotated into the cavity 24. For examples, mating sets of four projections 34, 34a may be used. The exemplary handle 30 shown in FIGS. 9-11 include a generally circular opening 35 with a narrow inlet that snaps over a generally round dowel 36 having flat opposing sides to secure the handle 40 to the housing 20. The opening 35 and dowel 36 replace the opening 29 and projections 31 shown in and discussed with reference to FIGS. 1-4, 7, and 8.

In operation, the locking device 30 is rotated out of the cavity 24 to expose the cavity 24. The tablet device 11 is slid into the cavity 24 and the locking device 30 is rotated into the end of the cavity 24 to lock the tablet device 11 in the cavity 24. The housing 20 is inserted into the non-tapered end of the stand 30 and slid until it contacts the tapered end of the stand 30. The stand 30 is prevented from sliding past the contoured end (contour 21) of the housing 20 by its contoured end (contour 42). Sidewalls of the stand 30 cover and fully protect the tablet device 11 and its display screen, buttons, and other operative components. Therefore, to provide protection while the tablet device 11 is carried, the housing 20 is inserted into the stand 30, and both are carried by the user.

It is to be understood that the above-described embodiments are merely illustrative of some of the many specific embodiments that represent applications of the principles of the present invention. Clearly, numerous and other arrangements can be readily devised by those skilled in the art without departing from the scope of the invention.

The invention claimed is:
1. Apparatus comprising:
a housing having handles at opposite ends thereof and a cavity sized to receive and surround an electronic tablet device, the cavity having a front surface opening configured to expose operative portions of a front surface of the electronic tablet device when it is disposed in the cavity, one or more openings disposed in a rear surface of the cavity that expose one or more operative components of a rear surface of the electronic tablet device when it is disposed in the housing, and a locking device for securing the electronic tablet device within the housing; and
a protective stand having an opening extending therethrough that is configured to slidably receive the housing, prevent the stand from losing contact with the housing when carried, and cover the front and rear surface openings of the housing when carried, and having angled and orthogonal slots formed on an outer surface that are sized to receive a selected edge of the housing to support the housing for display to a user.

2. The apparatus recited in claim 1 wherein outer lateral edges of one end of the housing are inwardly contoured and lateral inner edges of the opening of the protective stand are similarly contoured to prevent the stand from loosing contact with the housing when carried.

3. The apparatus recited in claim 1 wherein the cavity is open at one edge and is sized to slidably receive and surround the electronic tablet device and wherein the locking device is rotatably secured to the housing and is rotatable into and out of the open end of the cavity.

4. The apparatus recited in claim 1 wherein the housing further comprises one or more wireless speakers.

5. The apparatus recited in claim 4 wherein the one or more wireless speakers comprise Bluetooth-enabled speakers.

6. The apparatus recited in claim 1 wherein the housing comprises a set of alligator-like projections disposed on a sidewall of the cavity and a mating set of alligator-like projections is disposed on an adjacent outer surface of the locking device.

7. The apparatus recited in claim 1 wherein the housing comprises axially-aligned circular openings in the front and rear surfaces and the locking device comprises lateral projections that are insertable in the circular openings.

8. The apparatus recited in claim 1 wherein the housing comprises a circular cavity extending along a portion of its length that is configured to receive a pencil-like device.

9. The apparatus recited in claim 1 wherein the angled and orthogonal slots are formed by external projections on a surface of the stand that extend away from the otherwise flat surface of the stand, and wherein a selected external projection comprises a circular cavity extending along a portion of its length that is configured to receive a pencil-like device.

10. Apparatus comprising:
a housing having handles at opposite ends thereof and a cavity open at one edge that is sized to slidably receive and surround an electronic tablet device, the cavity having a front surface opening configured to expose operative portions of a front surface of the electronic tablet device when it is disposed in the cavity, one or more openings disposed in a rear surface of the cavity that expose one or more operative components of a rear surface of the electronic tablet device when it is disposed in the housing, and a locking device that is insertable into the open end of the cavity to secure the electronic tablet device within the housing; and a protective stand having an opening extending therethrough that is configured to slidably receive the housing, prevent the stand from losing contact with the housing when carried, and cover the front and rear surface openings of the housing when carried, and having angled and orthogonal slots formed on an outer surface that are sized to receive a selected edge of the housing to support the housing for display to a user.

11. The apparatus recited in claim 10 wherein outer lateral edges of at least one end of the housing are inwardly contoured and lateral inner edges of the opening of the protective stand are similarly contoured to prevent the stand from loosing contact with the housing when carried.

12. The apparatus recited in claim 10 wherein the locking device is rotatably secured to the housing and is rotatable into and out of the open end of the cavity.

13. The apparatus recited in claim 10 wherein the housing further comprises one or more wireless speakers.

14. The apparatus recited in claim 13 wherein the one or more wireless speakers comprise Bluetooth-enabled speakers.

15. The apparatus recited in claim 10 wherein the housing comprises a set of alligator-like projections disposed on a sidewall of the cavity and a mating set of alligator-like projections is disposed on an adjacent outer surface of the locking device.

16. The apparatus recited in claim 10 wherein the housing comprises axially-aligned circular openings in the front and rear surfaces and the locking device comprises lateral projections that are insertable in the circular openings.

17. The apparatus recited in claim 10 wherein the housing comprises a circular cavity extending along a portion of its length that is configured to receive a pencil-like device.

18. The apparatus recited in claim 10 wherein the angled and orthogonal slots are formed by external projections on a surface of the stand that extend away from the otherwise flat surface of the stand, and wherein a selected external projection comprises a circular cavity extending along a portion of its length that is configured to receive a pencil-like device.

19. Apparatus comprising:
a housing having handles at opposite ends thereof and a cavity sized to receive and surround an electronic tablet device, the cavity having a front surface opening configured to expose operative portions of a front surface of the electronic tablet device when it is disposed in the cavity, one or more openings disposed in a rear surface of the cavity that expose one or more operative components of a rear surface of the electronic tablet device when it is disposed in the housing, and a locking device for securing the electronic tablet device within the housing; and
a protective stand having an opening extending therethrough that is configured to slidably receive the housing, prevent the stand from losing contact with the housing when carried, and cover the front and rear surface openings of the housing when carried, and having an outer surface that is configured to receive a selected edge of the housing to support the housing for display to a user.

20. The apparatus recited in claim 19 wherein the protective stand comprises one or more slots that are sized to receive a selected edge of the housing to support the housing for display to a user.

\* \* \* \* \*